No. 856,515. PATENTED JUNE 11, 1907.
W. O. CUTTER.
BRUSH HOLDER.
APPLICATION FILED FEB. 19, 1906.
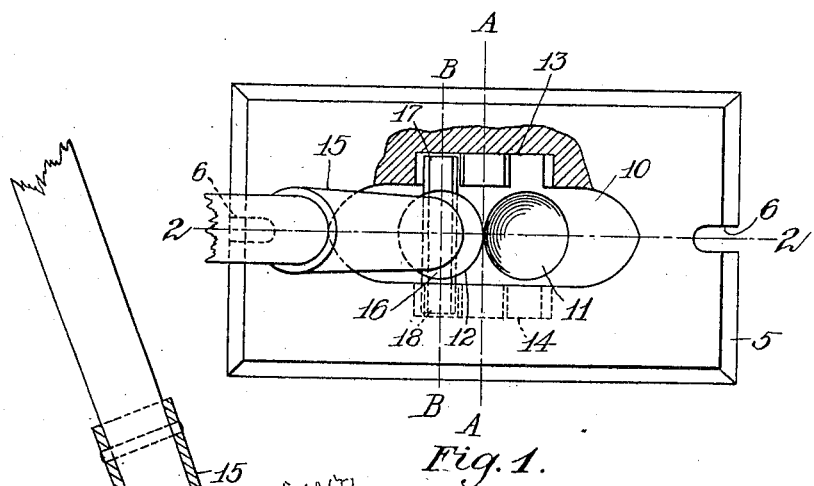
Fig. 1.
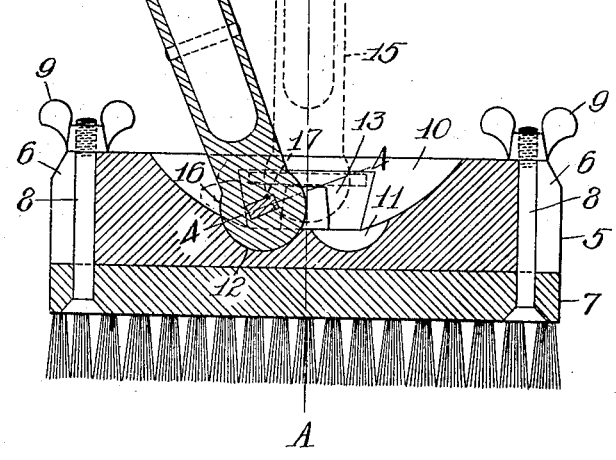
Fig. 2.
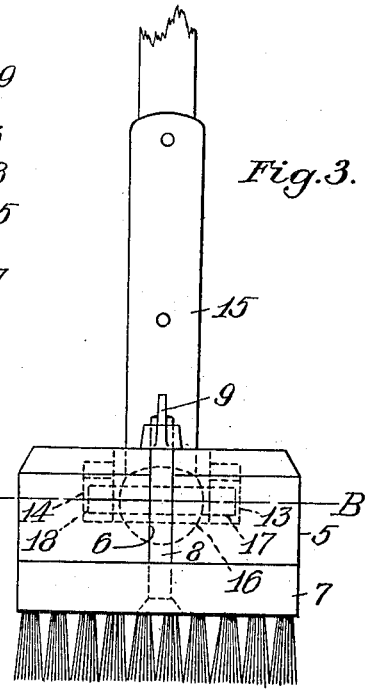
Fig. 3.
Fig. 4.
Witnesses: Inventor:
William O. Cutter,
by his attorney,

# UNITED STATES PATENT OFFICE.

WILLIAM O. CUTTER, OF NATICK, MASSACHUSETTS.

BRUSH-HOLDER.

No. 856,515.

Specification of Letters Patent.

Patented June 11, 1907.

Application filed February 19, 1906. Serial No. 301,781.

*To all whom it may concern:*

Be it known that I, WILLIAM O. CUTTER, a citizen of the United States, residing at Natick, in the county of Middlesex and State of Massachusetts, have invented new and useful Improvements in Brush-Holders, of which the following is a specification.

This invention relates to a holder adapted to hold a scrubbing brush or the like, said holder having a handle pivotally attached thereto, and the object is First, to provide a device of the character described so constructed and arranged that said brush may be caused to wear evenly. Second, to make easy the removal of said handle from said holder and the reversal of said handle in said holder without the use of tools and without raising said holder from the floor or holding said holder in the hands during said removal or reversal.

The invention consists in the combination and arrangement of parts set forth in the accompanying specification and particularly pointed out in the claims thereof.

Referring to the drawings, Figure 1 is a plan view, partly in section, of my improved holder for scrubbing brush or the like. Fig. 2 is a section, partly in elevation, taken on line 2—2 of Fig. 1, but with a scrubbing brush attached to the holder. Fig. 3 is an end elevation of the same viewed from the right of Fig. 2. Fig. 4 is a detail sectional view of the lower end of the handle taken on line 4—4 of Fig. 2.

In the drawings, 5 is a holder, preferably formed of metal, said holder provided with slots 6, 6. A scrubbing brush 7 is attached to the holder 5 by means of screws 8, 8 provided with thumb-nuts 9, 9, said screws engaging the slots 6, 6. The holder 5 is provided with a deep depression 10 formed therein, and also with two substantially hemispherical depressions 11 and 12 formed therein, said hemispherical depressions located on opposite sides of the transverse vertical median plane A, A of the brush 7. The holder 5 is also provided with two inverted U-shaped lateral recesses 13 and 14 located on opposite sides of the depression 10.

A handle 15 is provided with a substantially spherical end 16 adapted to engage either of the depressions 11 and 12. The spherical end 16 of the handle 15 is provided with two diametrically opposite lateral projections 17 and 18, said projections preferably made in the form of a pin extending through said spherical end and fast therein. When it is desired to remove the handle 15 from the holder 5, said handle is raised until the projections 17 and 18 come in contact with the upper edges of the U-shaped slots 13 and 14, the handle 15 may then be moved to the position shown in dotted lines, Fig. 2, and said handle when in said position may be turned until its horizontal median axial line B—B is moved to a position substantially coincident with the line 2—2, Fig. 1, whereupon said handle may be lifted out of said holder. It follows that the handle 15 may be returned to its place in the holder by simply reversing the sequence of movements above described. If, in the use of the device of this invention, the brush 7 becomes worn more at its left-hand end (Figs. 1 and 2) than at its right hand end due to the unequal pressure upon said ends, the spherical end 15 of the handle 16 may be caused to engage the hemispherical depression 11 by lifting said handle until the projections 17 and 18 bear against the upper edge of the U-shaped slots 13 and 14, whereupon said handle may be moved toward the right and dropped into a position with said spherical end engaging said hemispherical depression.

In the use of my holder for scrubbing brush or the like, the operator moves the brush 7 backward and forward across the floor by means of the handle 15, said handle rocking on its horizontal median axial line B—B. The spherical end 16 may be moved back and forth from the hemispherical depression 11 to the hemispherical depression 12 from time to time to equalize the wear on the brush 7.

It will be seen that removal of the handle 15 from the holder 5 may be effected without the use of tools and without raising said holder from the floor or grasping said holder with the hands. The brush 7 when it has become worn may be readily detached from the holder 5 by removal of the thumb-nuts 9, 9, and may be replaced with a new brush. It will be evident that a mop or a slab of pumice-stone might be attached to the holder 5 and used in a manner similar to that in which the brush 7 is used.

Having thus described my invention, what I claim and desire by Letters Patent to secure is:

1. In a device of the character described, a brush, a holder therefor provided with a hemispherical depression located at one side of the transverse vertical median plane of said brush, a handle having a spherical end adapted to enter said depression, and two projections on said spherical end adapted to enter recesses in said holder upon opposite sides of said depression.

2. In a device of the character described, a brush, a holder therefor provided with two hemispherical depressions located on opposite sides of the transverse vertical median plane of said brush, a handle having a spherical end adapted to enter either of said depressions, and two projections on said spherical end adapted to enter recesses in said holder upon opposite sides of said depressions.

3. In a device of the character described, a handle having one end formed substantially spherical and provided with two diametrically opposite projections from said spherical portion, and a holder adapted to hold a brush, said holder provided with a deep depression, two substantially hemispherical depressions leading from said deep depression, and two inverted U-shaped lateral recesses leading from said deep depression, either of said hemispherical depressions adapted to receive said spherical portion, and said recesses adapted to receive said projections.

4. In a device of the character described, a handle having one end formed substantially spherical and provided with two diametrically opposite lateral projections from said spherical portion, and a holder adapted to hold a brush, said holder provided with a deep depression, two substantially hemispherical depressions leading from said deep depression, and two lateral recesses leading from said deep depression, either of said hemispherical depressions adapted to receive said spherical portion, and said recesses adapted to receive said projections.

5. In a device of the character described, a handle provided at one end with two diametrically opposite lateral projections, and a holder adapted to hold a brush, said holder provided with a depression therein, and two inverted U-shaped lateral recesses leading from said depression, said depression adapted to receive said end, and said recesses adapted to receive said projections.

In testimony whereof I have hereunto set my hand in presence of two subscribing witnesses.

WILLIAM O. CUTTER

Witnesses:
CHARLES S. GOODING,
ANNIE J. DAILEY.